Dec. 24, 1963   J. H. WALLY, JR   3,115,058
OPTICAL DEVICE

Filed Dec. 5, 1960 4 Sheets-Sheet 1

INVENTOR.
Joseph H. Wally, Jr.,
BY
Brown, Jackson, Boettcher & Dienner
ATTYS

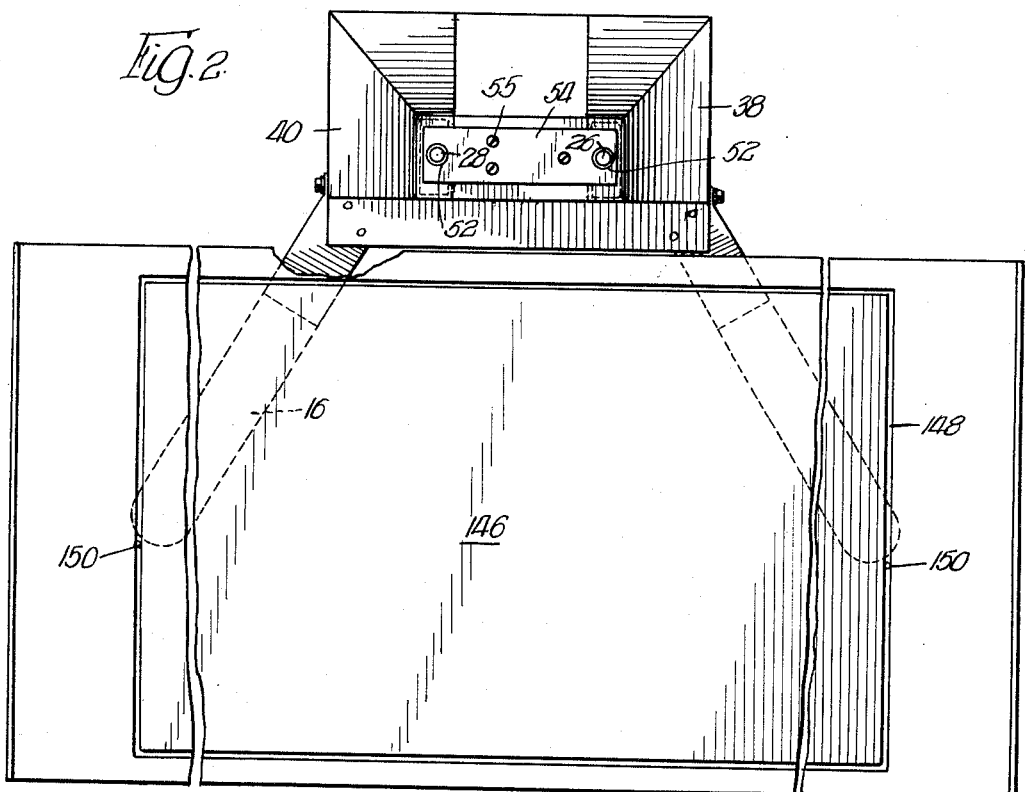
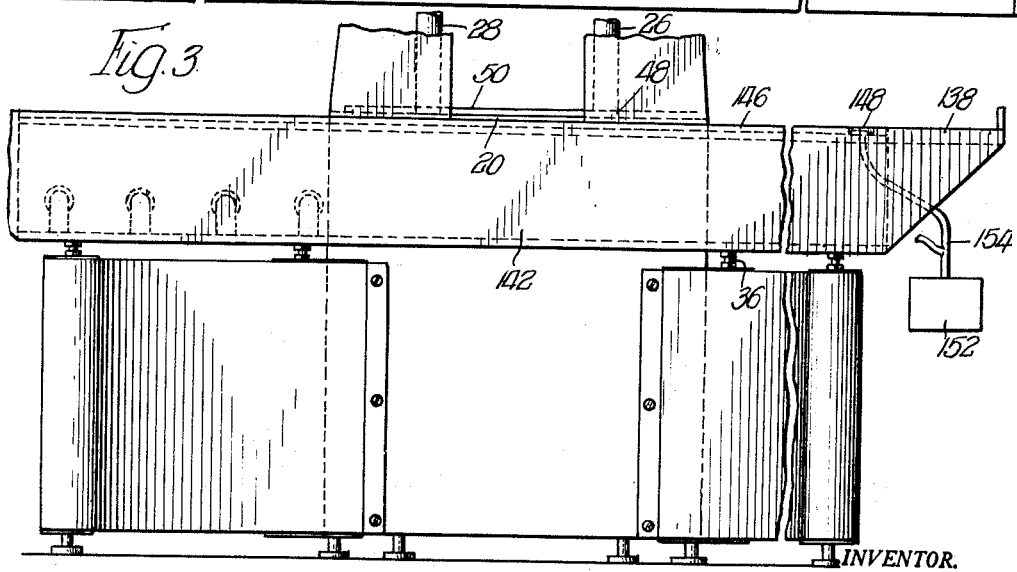

Dec. 24, 1963  J. H. WALLY, JR  3,115,058
OPTICAL DEVICE
Filed Dec. 5, 1960  4 Sheets-Sheet 3
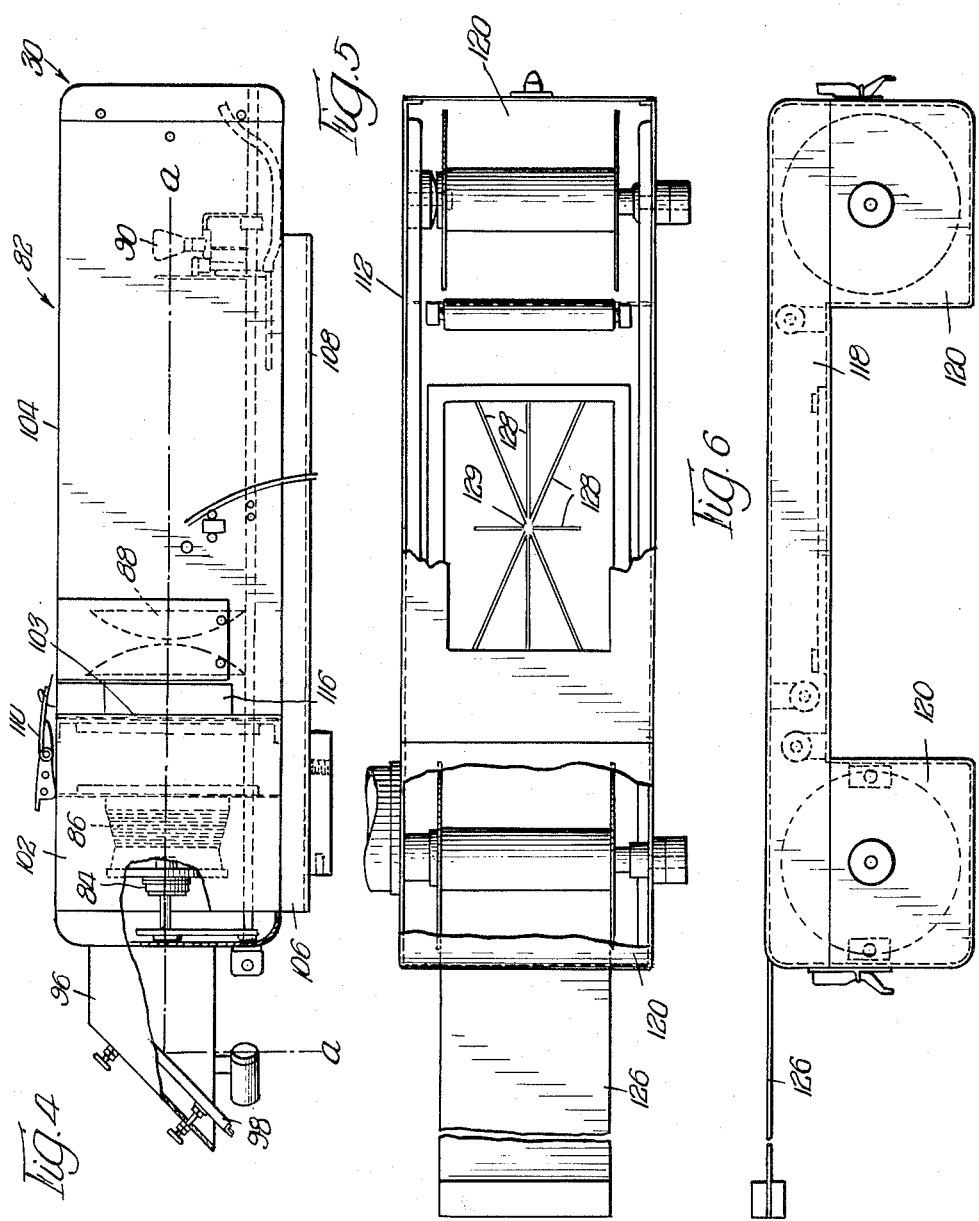
INVENTOR.
Joseph H. Wally, Jr.,
BY
Brown, Jackson, Boettcher & Dienner
ATTYS.

Dec. 24, 1963  J. H. WALLY, JR  3,115,058
OPTICAL DEVICE
Filed Dec. 5, 1960  4 Sheets-Sheet 4
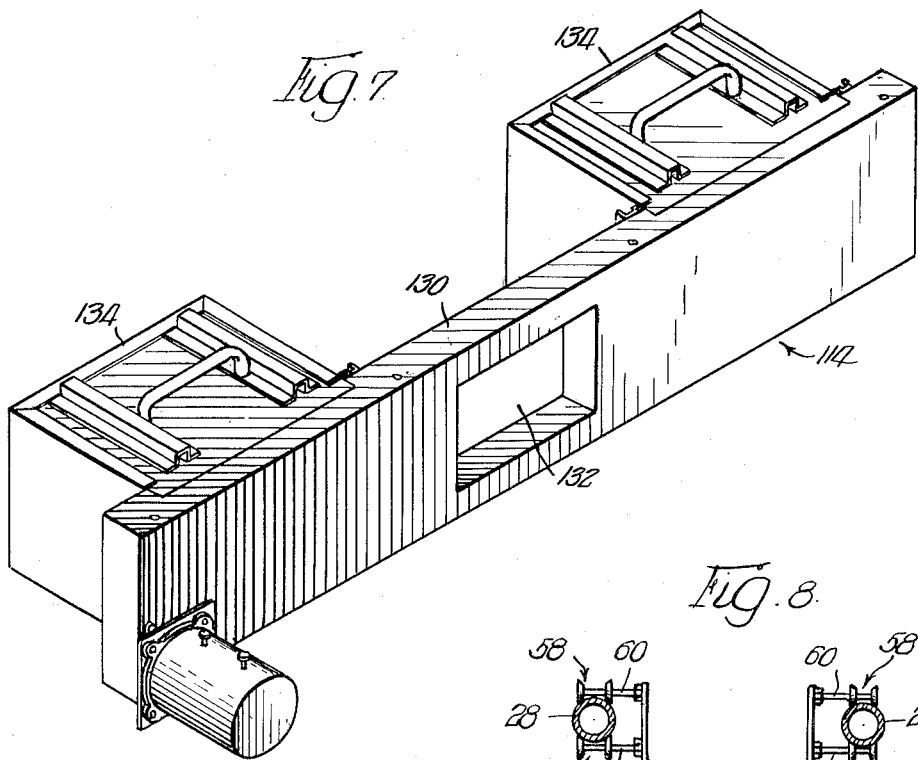
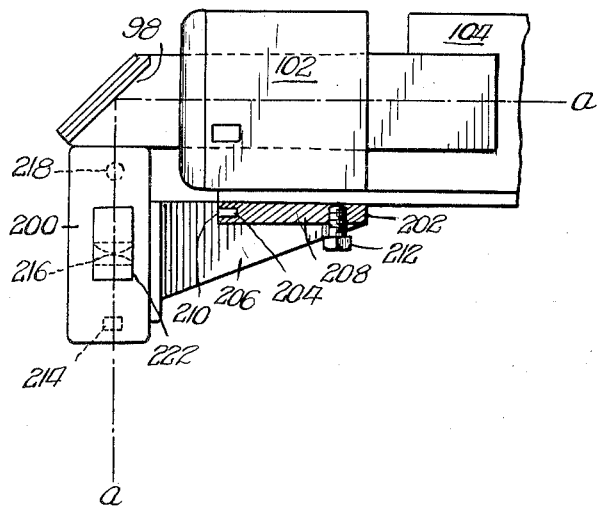
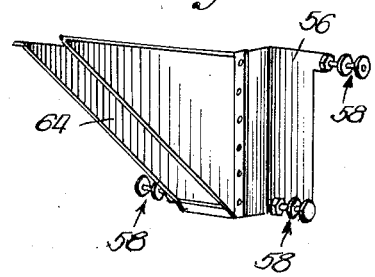
INVENTOR.
Joseph H Wally Jr.,
BY
Brown, Jackson, Boettcher & Dienner
ATTYS.

United States Patent Office 3,115,058
Patented Dec. 24, 1963

3,115,058
OPTICAL DEVICE
Joseph H. Wally, Jr., Mission Hills, Kans., assignor to Western Blue Print Company, Kansas City, Mo., a corporation of Missouri
Filed Dec. 5, 1960, Ser. No. 73,811
12 Claims. (Cl. 88—24)

This invention relates generally to optical devices, and more particularly to a combination camera-projector having its principal use in microphotography.

One of the problems in reproduction of drawings and the like by photographing is that involving resolution or sharpness of image as taken by the camera and as later projected by the projector for viewing and/or as utilized in producing prints from the developed negatives. To this end, it is important not only to have lenses in the camera and/or projector which are of ample capacity for process work (flat field and good resolution power), to use film which is of sufficiently fine grain to resolve a detail transmitted to it, and to use good developing chemicals for accurate image definition, but it is also important to be able to hold the easel, and particularly the camera or projector head, rigid and immobile during the actual photographing or projecting to assure the necessary optical alignment as well as spacing.

In an optical device of this type where the camera or projector head is supported over the easel or subject holder for the purpose of saving floor area, the problem of establishing and maintaining a rigid stable support and alignment of the easel and optical components is particularly acute and, to my knowledge, was only imperfectly satisfied prior to my invention. This has been so because not only is it necessary that the head containing the optical components be capable of traveling vertically toward and away from the easel over which it is centered to obtain a variety of magnification and/or reduction diameters but it is also desirable from a convenience point to be able to maintain the area above and surrounding the easel clear and unobstructed. The problem of supporting the optical head in a stable predetermined axial alignment is further intensified by the heavy weight of the optical components and the vertical distance through which the head must travel where the aim is to be able to miniaturize large scaled drawings and the like to several reduction sizes.

One of the features of a device according to the present invention is that it have a optical head which may be adapted at the will of the operator either as a camera or as a projector. To this end, I provide my optical head with a source of illumination as well as condenser lenses and interchangeable film magazines which will occlude the light source when the device is operated as a camera. This, however, considerably lengthens the longitudinal dimension of the optical head as well as increasing its weight.

In most prior art projector devices, the optical system and light source have been optically aligned along a vertical axis which is centered and perpendicular to the easel or other screen constituting member. However, I contemplated a camera using 105 mm. film and one which was capable of as much as 11 diameters of reduction of copy material up to sizes 44 by 66 inches. This meant that when I added condenser lenses and a light source to the camera head so that it might also be useful as a projector, under controllable circumstances, the weight of the optical head was upped to near 200 pounds and the housing length increased to nearly four feet. This would make it essential that the support for the head extend to at least a height of some 15 or 16 feet which is beyond a normal office height. Also, it had been conventional to vertically support the optical head at the outer end of a horizontal arm which was mounted by means of its opposite end in cantilever fashion to an upright or the like which was purposefully located to one side and off the easel. This was necessary to provide an unobstructed easel yet permit the optical system to be axially aligned with the center of the easel. However, with the increased length and weight of my combined camera-projector head, such a mounting arrangement was far from satisfactory. It was unwieldly and cumbersome and could not easily be made rigid and immobile. Only poor resolution of image could be expected under such circumstances. Although it might have been possible to achieve and maintain the necessary perfect or near-perfect right angularity and immobile fixation of the optical axis of my camera-projector head through use of multiple tie rods, braces, guy members and the like, such would not only detract from the general appearance of the optical device but the use of such members, etc., would also obstruct working space in the rear or at the sides of the easel and seriously hamper the operator in working on and about the device.

Accordingly, a principal object of the present invention is to provide an optical device having a novel and improved support by means of which its optical head may be provided the necessary rigidity and immobility and yet be conveniently maneuverable relative to the easel and assure the obtaining of satisfactory negatives having good image resolution and also prints therefrom with details crisply and sharply reproduced.

A more specific object of my invention is to provide a novel and improved supporting structure for the easel whereby it may be accurately located to a desired horizontal position and also a new and improved support embodying a pair of guide rails and means by which the optical head may be stably mounted in a horizontal position and cradled therebetween as it is vertically adjusted along the length of said guide rails to different spacings from the easel to permit desired diameters of reduction and/or magnification.

Still another object of my invention is to provide a construction of optical head having inter-changeable film magazines whereby it may be made selectively useful either as a camera or as a projector in a convenient and entirely practicable manner.

Still another object of my invention is to provide an optical device which may be useful either as a camera or as a projector and for at least two different sizes of film.

Thus, it is a feature of my invention that I provide a first optical head including a light source, condenser lenses, film holder and objective lens aligned along a horizontal optical axis and at the end of which I provide an inclined mirror or reflecting surface by which the optical axis of the system may be bent at right angles and perpendicular to the easel. By so arranging the optical components of my camera-projector head, I am able to considerably reduce the height of the offset supports therefor. Moreover, in this new position I am able to extend it rearwardly between a pair of spaced supporting uprights so that the weight of the forward projection of the optical head over the easel may be counter-balanced at least in part by a portion of its own weight while still obtaining axial alignment of its optical system with the easel.

It is a further feature of my invention that I not only arrange the components of my camera projector head along a horizontal axis, but that I support said head on a slide provided with roller bearings which engage about vertically disposed guide rails so as to permit free sliding vertical adjustment of the head, but prevent the head from being turned or disturbed from a preset alignment of its optical axis with respect to the easel.

A further feature of my invention is that I provide pyramidal shaped shrouds which enclose said guide rails on at least three sides thereof and provide means to which the top and bottom ends of said guide rails may be mounted so as to be rigidly mounted in spaced true vertical parallel relation.

Still another feature of my invention is that I can also use said horizontally disposed optical head as a support for a second optical head which may be adapted for use with smaller size film. This I may obtain by providing attaching means adjacent the outer lower end of the horizontal optical head and including alignment means whereby the second optical head may be suspended beneath the inclined mirror and centered with respect to the easel.

Still another feature of my invention is that I provide at least my main optical head in two parts and with means whereby one part may be slid away from the other without disunion of the parts so as to open a space into which a film magazine and holder may be slipped into alignment with the optical components of said head or removed therefrom, after which the two parts may be again latched to hold the optical components in proper spacing and axial ailgnment.

Many other objects as well as features and advantages of the invention will be at once apparent or will become so from the description of a preferred embodiment of the invention which now follows.

Referring therefore to the drawings:

FIGURE 2 is a view taken from above the device, but with the optical head removed;

FIGURE 3 is a front view, partially broken away, showing details in construction of the easel and the manner in which the lower edges of the shrouds and guide tubes or rails are mounted with respect to the base;

FIGURE 4 is a side view of the principal optical head, partially fragmented to show details of the reflector mounting and with the optical components of said head shown in dotted lines;

FIGURE 5 is a side view of the film magazine by which said principal optical head is adapted as a camera;

FIGURE 6 is a top plan view thereof;

FIGURE 7 is a perspective view of a second film magazine by which said principal optical head is adapted as a projector;

FIGURES 8 and 9 show details in the construction of the side member and means by which it is assembled with the guide tubes or rails to support the principal optical head; and FIGURE 10 illustrates the secondary optical head and means of attaching it to the principal optical head.

Figure 1:
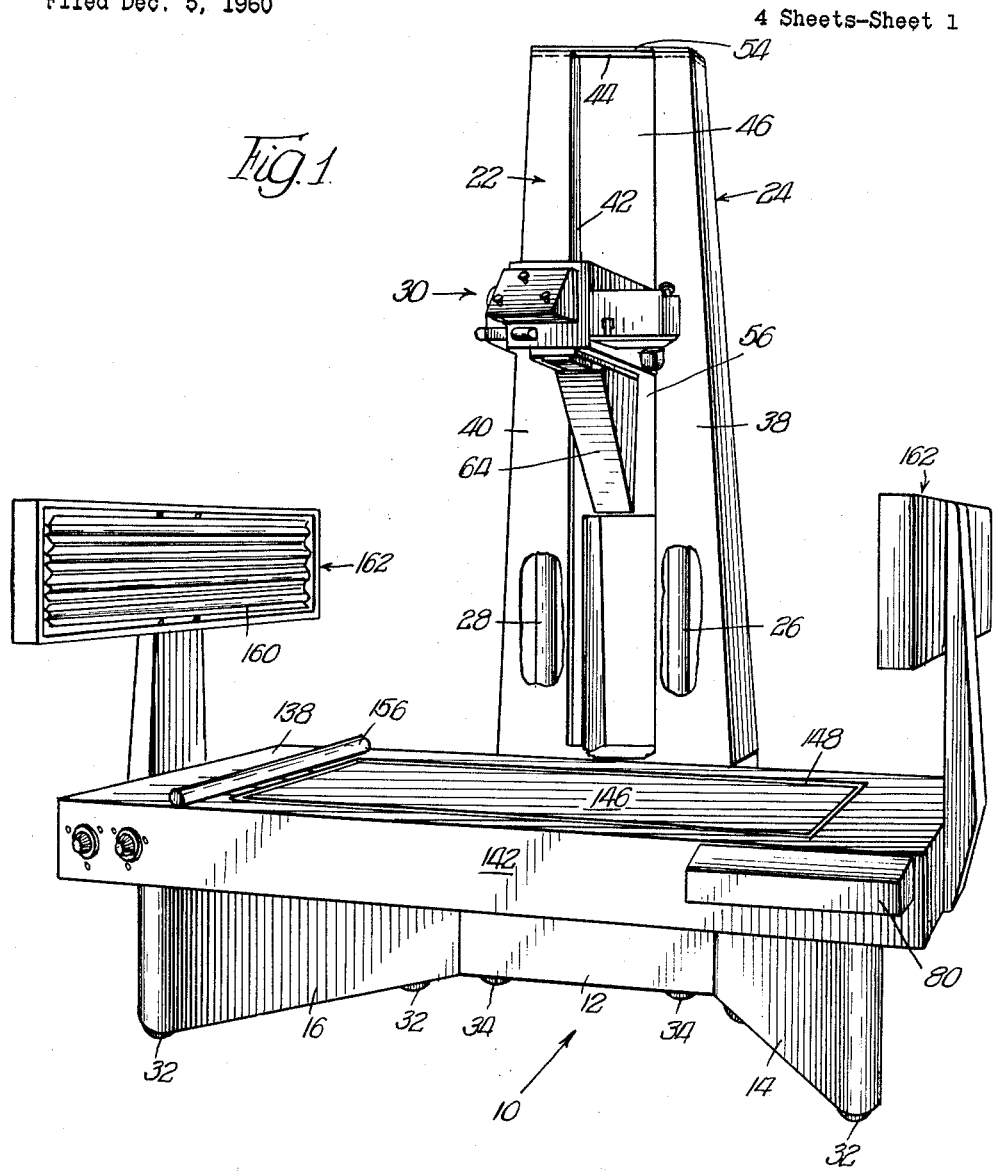
FIGURE 1 is a perspective view of an optical device comprising my invention.

Turning now more specifically to the drawings and first to FIGURES 1, 2 and 3, a combined camera-projector for micro-photography is there illustrated at 10 as comprising a base 12 having a pair of wing-like pedestal legs 14, 16, angularly related to said base and which serve to support the box-like easel or subject holder indicated generally at 18. Welded to the top wall 20 of base 12 are a pair of columns indicated generally at 22, 24, which serve to secure a pair of guide tubes or rails 26, 28, in a perpendicular relation to the easel 18. Between said guide rails is slidably supported an optical head indicated generally at 30. Details of the construction of said optical head 30 and its mounting in vertical sliding movement with respect to guide rails 26, 28 will hereinafter be detailed.

Base 12 is formed with four substantially parallel sides of relatively flat material, such as sheet steel or the like, is generally rectangular in cross-section and supports top plate 20 to which said sides are welded, bolted or otherwise rigidly secured. The wing-like legs 14, 16 are similarly formed of relatively flat material, such as sheet steel or the like, and have opposed parallel sides and a closed outer end. Said legs 14, 16 are suitably attached to the base 12 as by nuts and bolt assemblies (not shown), although they may be welded or otherwise rigidly secured therewith. In the embodiment shown, said legs 14, 16 are provided with adjusting means 32 which may be of a conventional set screw type to provide suitable adjustment with the floor surface. Base 12 is also provided at the four corners thereof, with similar adjusting means as indicated at 34. At the top of each leg 14, 16, pairs of similar set screw adjusting means 36 are provided which adjustably support easel 18 in legs 14, 16. It will be apparent that by suitably adjusting set screws 32, 34 and 36, the top surface of easel 18 may be located in a desired horizontal plane.

Columns 22 and 24 each comprises an elongated vertically extending hollow four-sided shell or shroud 38, 40, larger at the bottom and narrower at the top forming an oblique elongated pyramid of relatively flat material, such as sheet steel or the like, rectangular in overall cross section, but with a portion of their inner side open as at 42 to provide communication with the interior thereof along the vertical length of said shrouds. The lower edges of said shrouds are welded or otherwise permanently fixed to the top plate 20 of base 12, and their upper edges are similarly permanently fixed as by welding to a top plate 44, which plate 44 with base 12 join the two columns 22, 24 into an integral structure having an opening 46 extending vertically therebetween, through which optical head 30 extends and is adjusted vertically.

Vertically extending guide posts or rails 26, 28 have their lower ends fitted within suitable openings 48 provided in plate 50, which is fixed to base plate 20 as by screws or the like (not shown). The upper ends of said guide posts 26, 28 are shown extended through larger openings in top plate 44 and fitted into openings 52 provided in plate 54 which is mounted on the top side of plate 44 and secured thereto as by screws 55. The openings in plates 50 and 54 which receive the ends of guide rails 26, 28 are carefully drilled by means of a template, so that the ends of the guide post 26, 28 will fit therein, but will not be free to move sidewise therein. Said openings are further carefully and accurately spaced, so that the two guide rails 26, 28 are maintained by said plates 50, 54 in an accurately aligned parallel spaced relation. Although plate 50 is preferably immobilized with respect to base plate 20, openings in plate 54 through which screws 55 extend are drilled or formed slightly larger in diameter than the stud diameter of the screws. This permits a limited horizontal adjustment of plate 54 relative to its supporting plate 44 to permit any necessary adjustment of the guide rails 26, 28 before tightening of said screws 54 to their necessary vertical or right angular relation to the easel 18. If attaching plate 54 is disposed on the underside of top plate 44 then the latter will, of course, need not have openings to receive guide posts 26, 28. By reason of the generally pyramidal shape afforded shrouds 38, 40, the guide rods 26, 28 are rigidly supported against possible sway under the weight of the optical head 30, particularly at the higher levels to which it may be adjusted. This support is further obtained in an attractive manner without the inconvenience of guide rods, angular separate support members, and the like. I have found that the corners which are developed when the sheet metal is bent to pyramidal form, as well as its tapered shape, afford maximum strength and rigidity to the top ends of the guide rails 26, 28 which they support. Member 56 is disposed for vertical sliding movement lengthwise of said guide rails and is keyed against turning thereon by means indicated generally at 58. Said means, it will be seen in FIGURES 7 and 8, comprise two pairs of shafts 60, one pair being mounted on opposite side of slide member 56 adjacent the forward lower edges thereof and the other pair also being mounted on opposite sides of slide member 56 but adjacent the upper rear edges of the slide member. Each of said shafts supports a pair of spaced bearings which engage at spaced points about the respective guide rails. This makes for a simple but very stable mounting of the optical head 30 when secured thereto. Projecting forwardly of slide member 56 is a triangular box shaped member 64 also formed of sheet metal or the like which provides further support for the optical head 30. I have found that through the aforedescribed locations of the bearing means 58 and the triangulated forwardly projecting support 64, I can so mount the optical head 30 so that it is immobile against horizontal as well as vertical movement relative to slide member 56 and can be held thereby in a true normal relation to the guide rails 26, 28, i.e. parallel to the easel 18. It may also be conveniently raised and lowered without disturbing said prefixed relation to the easel. Although any convenient means may be utilized for raising and lowering the slide member 56 with the optical head 30 mounted thereon, one such arrangement would be by means of chains attached intermediate its ends to the slide 56, one end of the chain passing over a pulley mounted on the upper end in each of the guide rails 26, 28. These guide rails are, in this instance, in tubular form and hollow so that they may conveniently receive a counter weight fixed to the end of the chain. The opposite end of the chains will be connected by appropriate gearing so as to be driven by a reversible motor operated through appropriate switches in control panel 80 to accomplish lowering and raising of the optical head. Appropriate means may be provided for limiting the vertical adjustments of the optical head to predetermined levels.

Referring now to FIGURE 4 optical head 30 will be seen to comprise an elongated horizontally disposed housing enclosing an objective lens system 84, adjustable bellow 86, a pair of condenser lenses 88, and a point source of illumination 90, said point source of illumination being mounted on a track 94 on which is also supported the objective lenses 84 and which are adapted for movement under the control of a motor (not shown) in order to maintain the point source of light along the true optical axis of the system as it is adjusted toward and away from the condenser lenses with adjustment of the objective lenses to provide different focal lengths. Details in construction of such an adjustable point source of light are more particularly described in Wally and Grunwald United States Patent No. 2,843,010, issued July 15, 1958, to which reference may be had for a more specific description of its construction and operation.

Forwardly of housing 82 is a first surface mirror 98 which is adjustably mounted on support 96 therefor by means 100 so that light rays directed from point source 90 as directed through the condenser, film and objective lenses along optical axis a will be directed to the easel over which said reflector 98 is centered. It will be recognized that through the use of such a reflector, the optical head 82 may be horizontally located so as to reduce the necessary height of guide rails 26, 28. It will further be appreciated that the excess length of the optical head 30 necessary to properly center the reflector with respect to easel 18 may protrude rearwardly of the columns 22, 24 so as to be out of the way and at the same time will aid in counterbalancing the weight of the optical head as it is supported by slide 56.

One of the features of my invention is that said optical head 30 may be utilized either as a camera or as a projector. This is obtained through the simple interchange of suitable film magazines.

Referring again to FIGURE 4, housing 82 will be seen to be divided into two parts indicated at 102 and 104. The two parts being provided with telescoping elements 106 and 108 located on the underside of the two parts and are held together by latching means indicated generally at 110. Thus part 102 may be conveniently slid back a sufficient distance from the end 103 of 104 to allow the insertion or removal of a film magazine indicated generally at 112 in FIGURE 5 or 114 in FIGURE 7 into provided space 116. It will be noted that each of these magazines includes a pair of film enclosures which extend rearwardly and overlie opposite sides of the housing of part 104. Once the film magazine has been so positioned within slot 116, part 102 may then be slid forwardly against edge 103 and latched to part 104. If desired, appropriate handles may be provided on part 102 to aid in manipulating said part 102.

Referring now to FIGURES 5 and 6, film magazine 112 is there shown as comprising a pair of reel enclosures 120 and a connecting web portion 118, the latter being opaque and adapted when properly seated through opening 116 to preclude the possibility of light passing from illuminating source 90 to the film. The reel enclosures 120 have covers which may be hinged and latched to the main structure of the magazine 112. These reel enclosures including the covers and seating thereof are so constructed as to be essentially light-proof. Appropriate hand-operated shutter means 126 will also be provided in order to seal web 118 from light as when the magazine is loaded with film that is to be exposed or has been exposed. Shutter 126, is of course, opened when ready for taking photographs. In order that each frame of the film be aligned with the optical axis $a$ of the system and may be properly spaced from the objective lenses 84, vacuum means are provided including a plurality of communicating channels 128 arranged in an essentially sunburst pattern about an opening 129 which communicates with suitable evacuating apparatus. The effect is, of course, to draw the film tightly against the supporting surface of web 118 where it will be both stably mounted and correctly spaced for proper focusing of an image thereon.

Where the optical head is intended to be operated as a projector, the film magazine illustrated at 114 in FIGURE 7 will be used. Referring to said FIGURE 7, said magazine also includes a central web 130, but which is provided with a central aperture 132 through which illumination from source 90 will be directed to permit projection of its image onto screen or easel 18. At the opposite ends of said film magazine 114 are provided enclosures 134. In one of these is disposed a bank of film slides, web 130 being provided with suitable motor driven mechanisms for moving said slides, one at a time, into alignment with opening 132 and then restacking them into the opposite enclosure.

Referring again to FIGURES 1, 2 and 3, it will be seen that easel 18 comprises a box-like structure having a top wall 138, a bottom wall 140 and four sidewalls 142 which together define a right angular hollow parallelopiped.

Said top wall 138 has a central cut-out portion in which is mounted a sheet of translucent plate-glass 144 over which is located a second plate 146 of milk white Plexiglas. Formed inwardly of the outer edge of plate 146 is a continuous channel 148 having a pair of openings 150 with which evacuating pump 152 establishes communication via conduit members 154. Over Plexiglas plate 146 is disposed a sheet 156 of transparent flexible acetate material having one edge taped or otherwise secured to top wall 138, said flexible sheet 156 being so dimensioned and arranged to overlie plate 146 when unrolled. It will be appreciated that because acetate sheet 156 is flexible it may be conveniently rolled back to permit removal as well as location of copy work on the plate 146 which is to be photographed. Vacuum pump serves to evacuate through channel 148 the air beneath the unrolled sheet 156 so that it is tightly drawn against plate 146 so as to locate the copy work flat and at a fixed position to which the optical head may be related, wherefore, any size of drawing up to the inner dimensions of the area included by channel 148 may be thus fixed on the easel against movement and held flat. Within the easel fluorescent lights may be provided to illuminate the copy work from beneath. The copy work also may be front lighted by means of fluorescent lights 160 carried by mounts 162 secured to either side of the easel 18.

As described, my optical head 30 and its associated film magazines are intended to be utilized with 105 mm. film or other large sized film. It may operate either as a camera or as a projector depending on the particular film magazine coupled therewith. However, my device may also be adapted as a camera or as a projector utilizing smaller film, for example, more conventional 35 mm. film. This I obtain by providing a second optical head 200 which I suspend from the outer end of optical head 30 in such a way that its optical components are also along axis *a*.

Referring to FIGURE 10, it will be seen that I have provided optical head 30 with an attachment plate 202 secured adjacent the forward end of telescoping member 103 on part 104. This plate 202 has a pair of aligned openings 204 in the forward end thereof. Optical head 200 is provided with a rearwardly extending support member 206 having a recess at 208 which complements attachment plate 202. It is also provided with a pair of locating pins 210 which engage in said openings 204 so as to properly locate optical head 200 with respect to optical axis *a*. In order to prevent accidental separation of support 206 from its thus assembled relation with plate 202, means 212 may be threaded into plate 202. It should be understood that optical head 202 is a complete unit in and of itself. This is to say it includes an objective lens 214, condenser lense 216, and a source of lumination 218, all in properly spaced axial alignment. Because the spacing requirements of a projector system utilizing 35 mm. film are so much shorter than in the optical head 30 adapted for 105 mm. film, source of lumination 218 does not move as does point source 90 in optical head 30. In the optical system of a projector utilizing 35 mm. film the full range of movement of the objective to obtain diameter of 10 to 30 reductions and/or magnifications is only about ⅛ inch as compared to the nearly 2½ inches the objective must move in the optical head 30 to obtain its full range of reductions and/or magnifications.

Optical head 200 is also provided with film magazine 222 including a threading web by which the film may be located between condensers 216 and objective 214. Said magazine 222 also includes suitable enclosures for the roll or slide film pieces as the case be and which are located on opposite sides of the housing 200. These enclosures may be provided with appropriately removal covers by which the reels or slides may be inserted and/or removed. It will be appreciated that when the auxiliary optical head 200 is utilized as a camera, the illuminating source 218 will be turned off. Furthermore, because of the much lighter weight of optical head 200 it is unnecessary to provide interchangeable camera and projector magazines. The entire optical head may be separated from the device and carried to the developing area.

From the above description it will be clear that all of the objects, advantages and features of the invention may be obtained in a convenient, simple and entirely practical manner. It will, of course, be understood that said description is intended merely to illustrate a preferred form of the invention and not to be limiting thereof since many changes, modifications and substitutions will be understood as possible within the spirit of the invention; the scope of the invention being defined by the appended claims when considered in the light of the existing prior art.

Having described my invention, I claim:

1. In an optical device, the combination of a horizontally disposed easel, a pair of spaced vertical columns mounted to one side of said easel each including a generally pyramidal shroud and a guide rail supported between the top and bottom ends thereof in spaced vertical parallel relation, a slide member keyed between said rails for vertical sliding movement along the length thereof, a first optical head mounted adjacent one end to said support, said first optical head having an optical system within said head including an element at the other end of said head centered with respect to said easel for directing image forming light rays between said easel and through the optical system, a second optical head independent in its operation from said first optical head, and attachment means detachably mounting said second optical head to the underside of the first optical head and so as to have its lens opening in axial alignment with the said element of the optical system of the first optical head and centered over the easel.

2. The combination according to claim 1 wherein the attachment means includes an arm horizontally extending from one side of the second optical head, said first optical head including an attachment plate-like projection on its underside adjacent its said other end and a pair of openings in the outer end of said plate-like projection, said second optical head including a horizontally extending arm containing a recess shaped to mate with said plate-like projection and further including pins to fit within said openings in the outer end of the plate-like projection, and means releasably securing the arm to said plate-like projection to prevent accidental withdrawal of the pins from said openings.

3. In an optical device, the combination of a base, an easel horizontally supported to one side of said base, a pair of spaced vertical columns supported on said base, each of said columns comprising a generally pyramidal shaped shroud having one side open and facing the open side of the other shroud, a guide post disposed within each of said shrouds, top and bottom plates mounted to the top and bottom ends of the two shrouds maintaining the two guide posts in a predetermined spaced parallel relation, at least one of said plates being adjustably mounted to permit adjustment of the guide posts to true vertical positions, a slide disposed between said posts and having means keying it to said posts for vertical sliding adjustment along the length thereof, an elongated housing attached intermediate its two ends to said slide, the forward portion of said housing extending over the easel and at least partially counterbalanced by the rearward portion thereof, said housing containing an optical system having an element adjacent one end of the housing centered over the easel, a second housing containing a further optical system, and attachment means for detachably mounting said second housing to said first mentioned housing, said attachment means including alignment means whereby the optical system of the second housing when so mounted includes a lens opening disposed below said mentioned element of the optical system of the first housing and so as to be axially aligned and centered over the easel.

4. In an optical device, the combination of a base, an easel supported to one side of said base, said easel including a planar top surface and means for adjusting said top surface with respect to a horizontal plane, a pair of spaced vertical columns supported on said base, each of said columns including a pyramidal shaped shroud having an open side facing toward the open side of the other shroud, a vertical guide post of generally cylindrical shape disposed within each of said shrouds, means immobilizing one end of each said guide posts with respect to said base and means adjustably mounted on the upper ends of said shrouds securing said guide posts in spaced vertical parallel relation and fixed with respect to the top of said pyramidal shrouds, a support slidably mounted and keyed between said guide posts for vertical reciprocal movements along the length of said posts, an elongated housing attached to said support and extending horizontally between the two columns, the forward portion of said housing extending over the easel and having the weight thereof at least partially counterbalanced by the rearward portion of the housing, said portion projecting rearwardly of the two columns, said housing including a film holder and an optical lens system aligned therewith, said optical system having a horizontal optical axis and an inclined reflecting surface at one end of said optical lens system aligned therewith and over the center of the easel so as to direct image forming light rays between the easel and the optical lens system, and means for sliding said support vertically along the length of said guide posts to permit adjustment of the spacing of the lens system from the easel, said elongated housing further having attachment means on its underside whereby a second optical system and film holder may be suspended beneath said reflecting surface and with its optical axis aligned with the center of the subject holder.

5. In an optical device, the combination of a horizontally disposed easel, a pair of spaced vertical columns secured to one side of said easel, each of said columns including a vertically extending shroud supporting plate-like structures at their top and bottom ends, and a pair of guide rails supported by said plate-like structure and disposed one within each shroud, said guide rails being thereby disposed in spaced vertical parallel relation, a slide member keyed between said rails for sliding movement vertically along the length thereof, a horizontally disposed first optical head secured to said slide member, and extending through the space between said shrouds so as to include a forward portion overlying the easel and a further portion projecting rearwardly behind the rails, and an optical system within said first optical head including an element centered over the easel for directing image forming light rays between said easel and optical system, a second optical head, and attachment means for detachably mounting said second optical head to the underside of the horizontally disposed optical head and so as to be in axial alignment with the said element of the optical system of said optical head which is centered over the easel.

6. In an optical device, the combination of a horizontally disposed easel, a pair of spaced vertical columns secured to one side of said easel, each of said columns including a pair of vertical guide rails disposed in spaced parallel relation, a slide member keyed between said rails for sliding movement vertically along the length thereof, a horizontally disposed optical head mounted on said slide member so as to extend forwardly over the easel, said optical head being made in two parts, an optical system located within the forward of said two parts and including a reflector element centered over the easel for directing image-forming light rays between said easel and optical system, and said two parts being arranged with means whereby one part may be slid away from the other without disunion of the parts so as to open a space into which a film magazine and holder may be slipped into alignment with the optical system of said optical head and removed therefrom after which the two parts may be latched to hold the optical system in properly spaced axial alignment with the film magazine and holder.

7. In an optical device, the combination of a horizontally disposed easel, a pair of spaced vertical columns secured to one side of said easel, each of said columns including a vertically extending shroud supporting plate-like structures at their top and bottom ends, and a pair of guide rails supported by said plate-like structures, and disposed one within each shroud, said guide rails being thereby disposed in spaced parallel relation, a slide member keyed between said rails for sliding movement vertically along the length thereof, a horizontally disposed optical head secured to said slide member, and including a first portion extending forwardly through the space between said shrouds and a further portion extending rearwardly thereof, an optical system within said first portion including an element centered over the easel for directing image-forming light rays between said easel and optical system, a light source and condenser lens located in said further portion, said optical head including means whereby one portion may be slid away from the toher portion without dis-union of the two portions, so as to open a space into which a film magazine and holder may be slipped into and out of position between the optical system of said first portion and the condenser lens of the further portion, after which the two portions may be again united, and latch means to hold the two portions together with the optical system in properly spaced axial alignment with the film magazine and holder.

8. In an optical device, the combination of a horizontally disposed easel, vertical guide means disposed to one side of said easel, a slide member keyed for sliding movement vertically along the length of said vertical guide means toward and away from the easel, a horizontally disposed first optical head secured to said slide member, and including a portion extending forwardly of said vertical guide means, an optical system within said head including an element in said forward portion centered over the easel for directing image-forming light rays between said easel and optical system, a second optical head independent in its operation from said first optical head, and including a lens opening, attachment means on the underside of said first horizontally disposed optical head detachably mounting said second optical head thereto so as to dispose its lens opening in axial alignment beneath the said element of the optical system of said first optical head which is centered over the easel.

9. In an optical device, the combination of a base, a pair of elongated vertically extending, four-sided hollow shells of sheet material formed to a pyramidal shape having a larger bottom end and a narrower top end, said hollow shells having their bottom ends mounted on said base in a fixed spaced relation, and a spacer element joining the top ends of said pair of shells so as to retain said shells in spaced generally parallel fixed relation with respect to each other, the adjacent facing sides of the shells each having a longitudinal opening therein extending vertically along the length thereof, a guide rail mounted within each said shells between the top and bottom ends of said shells and supported thereby in spaced vertical parallel relation, a horizontally disposed easel supported to the forward side of said shells adjacent their bottom ends, means for adjusting the attitude of said guide rails with respect to said easel, a horizontally disposed optical head supported in the space between said shells for vertical movement along said guide rails by means extending through the longitudinal opening in the facing sides of said shells and slidably engaging said two vertical rails, said optical head including a rearwardly located portion containing illuminating means and a portion extending forwardly over the easel, said latter portion of the optical head containing an optical system and means for supporting film in alignment therewith, said optical system including a reflecting element, said reflector element being disposed in said forwardly extending portion and centered over the easel to direct image forming light rays between said film supporting means and the easel, and operable means acting on said head for raising and lowering the same to adjust the spacing of the reflector element from the easel.

10. The combination according to claim 9 wherein the optical system comprises condenser lens means and objective lens means spaced forwardly thereof, and the means for supporting film comprises a pair of film holders adapted to be interchangeably mounted between said objective lens means and condenser lens means, one of said film holders including an opaque back alignable with the condenser lens means for occluding light from the illuminating means and the other of said film holders including a light transmitting aperture aligned with the condenser lens means.

11. In an optical device, the combination of a horizontally supported easel, vertical guide means disposed to one side of said easel, a slide member keyed for sliding movement vertically along the length of said vertical guide means toward and away from the easel, a horizontally disposed optical head secured to said slide member including a portion extending forwardly of said guide means, illuminating means adjacent the rear end of said head, condenser lens means forwardly of said illuminating means, objective lens means spaced axially forwardly of said condenser lens means, slot means between said condenser lens means and objective lens means, said slot means being adjustable for selectively retaining interchangeable film holders therebetween, said interchangeable film holders each including a backer disposed for axial alignment with said condenser and objective lens means, and an element in the forwardly extending portion of said head centered over the easel for directing image-forming-light rays via said objective means between the easel and the respective film holder, one of said film holders including an opaque back which when aligned with the condenser lens means inhibits passage of light from the illuminating means, the other film holder having its back provided with a light transmitting aperture, whereby the device may be used as a projector for projecting an image onto the easel and also as a camera for photographing an image of a subject on the easel.

12. In an optical device, the combination of a horizontally disposed easel, vertical guide means disposed to one side of said easel, a slide member keyed for sliding movement vertically along the length of said vertical guide means toward and away from the easel, a horizontally disposed optical head secured to said slide member, and including a portion extending forwardly of said vertical guide means so as to overlie the easel, an optical system within said head including an element in said forward portion centered over the easel for directing image-forming light rays between said easel and optical system, and attachment means on the underside of said optical head by which a second optical head may be detachably mounted thereto with its lens opening in axial alignment beneath said element of the optical system of the first mentioned optical head which is centered over the easel.

References Cited in the file of this patent

UNITED STATES PATENTS

| | | |
|---|---|---|
| 1,883,510 | Bornmann | Oct. 18, 1932 |
| 2,137,028 | Rau | Nov. 15, 1938 |
| 2,202,353 | Morgan | May 28, 1940 |
| 2,346,490 | Huebner | Apr. 11, 1944 |
| 2,461,668 | Thompson | Feb. 15, 1949 |
| 2,800,833 | Kuscher | July 30, 1957 |
| 2,846,920 | Friedel | Aug. 12, 1958 |
| 2,945,428 | Dearborn | July 19, 1960 |

FOREIGN PATENTS

| | | |
|---|---|---|
| 292,101 | Switzerland | July 13, 1953 |